United States Patent
Hoffman et al.

(10) Patent No.: US 10,301,121 B1
(45) Date of Patent: May 28, 2019

(54) SYSTEM HAVING A CAROUSEL OF BUCKETS CONFIGURED TO INDUCT INVENTORY ITEMS INTO PACKAGING

(71) Applicant: Amazon Technologies, Inc., Seattle, WA (US)

(72) Inventors: Brian Hoffman, Seattle, WA (US); Martin Peter Aalund, Seattle, WA (US); David Alspaugh, Seattle, WA (US); Samuel Gardner Garrett, Seattle, WA (US); Paul Roy Raines, Jr., Seattle, WA (US); Timothy Alan Talda, Seattle, WA (US); Akshay Tilekar, Seattle, WA (US); Stephanie Tomasetta, Seattle, WA (US); Eric Wyman, Auburn, WA (US); Toby Ge Xu, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/655,318

(22) Filed: Jul. 20, 2017

(51) Int. Cl.
| | |
|---|---|
| *B65G 17/16* | (2006.01) |
| *B65G 47/46* | (2006.01) |
| *B65G 21/22* | (2006.01) |
| *B65G 15/00* | (2006.01) |
| *B65D 27/00* | (2006.01) |
| *B07C 1/06* | (2006.01) |
| *B07C 5/36* | (2006.01) |

(52) U.S. Cl.
CPC .............. *B65G 47/46* (2013.01); *B07C 1/06* (2013.01); *B07C 5/36* (2013.01); *B65D 27/00* (2013.01); *B65G 15/00* (2013.01); *B65G 21/22* (2013.01); *B65G 2814/0332* (2013.01)

(58) Field of Classification Search
CPC .......... B65G 17/16; B65G 17/20; B65G 17/22
USPC .......... 198/704, 706, 707, 712, 476.1, 477.1, 198/612, 613, 680, 867.1, 867.11, 803.14
See application file for complete search history.

(56) References Cited

U.S. PATENT DOCUMENTS

| | | | | |
|---|---|---|---|---|
| 1,056,523 A | * | 3/1913 | Ferris ..................... | B65G 67/42 414/382 |
| 1,113,738 A | * | 10/1914 | Beane ................... | E01C 19/475 198/704 |
| 2,595,689 A | * | 5/1952 | Mitchell .............. | B65G 17/126 198/704 |
| 3,055,486 A | * | 9/1962 | Meyer .................. | B65G 17/126 198/706 |
| 3,292,310 A | * | 12/1966 | Lefevre ................ | B65G 47/847 125/26 |
| 3,672,485 A | * | 6/1972 | Walters ................ | A01K 31/165 119/338 |

(Continued)

*Primary Examiner* — Joseph A Dillon, Jr.
(74) *Attorney, Agent, or Firm* — BakerHostetler

(57) ABSTRACT

In one embodiment, a system has a carousel that has a guiderail that forms a loop that has a loading position and an unloading position. The carousel also has a plurality of buckets, each having an upper end and a lower end. The lower end includes at least one bottom wall that is moveable between (i) a transporting configuration where the at least one bottom wall substantially closes the lower end of the bucket and (ii) a discharge configuration where the at least one bottom wall is moved so as to define an opening in the lower end of the bucket. The buckets are supported by the guiderail such that the buckets can be driven from the loading position towards the unloading position in the transporting configuration. The buckets can be transitioned to the discharge configuration so as to unload inventory items at the unloading position into a packaging material.

18 Claims, 8 Drawing Sheets

(56) References Cited

U.S. PATENT DOCUMENTS

| | | | | | |
|---|---|---|---|---|---|
| 3,817,369 | A | * | 6/1974 | Bluthardt | B65B 35/04 198/347.4 |
| 4,048,784 | A | * | 9/1977 | Toby | B26D 7/32 198/468.6 |
| 4,303,363 | A | * | 12/1981 | Cervin | B65G 47/57 198/464.3 |
| 4,557,368 | A | * | 12/1985 | Alameda | A01D 46/243 198/313 |
| 4,643,495 | A | * | 2/1987 | Pepping | B65G 1/127 198/800 |
| 5,105,933 | A | * | 4/1992 | Gough | B65G 47/40 198/706 |
| 5,125,500 | A | * | 6/1992 | Cailbault | B07C 3/082 198/470.1 |
| 5,346,052 | A | * | 9/1994 | Fox | A01K 5/0266 198/350 |
| 5,526,921 | A | * | 6/1996 | Kovalak | B65G 47/40 198/706 |
| 6,471,042 | B1 | * | 10/2002 | Van De Dungen | A22C 11/001 198/703 |
| 6,945,386 | B2 | * | 9/2005 | Bierschenk | B65G 17/123 198/703 |
| 7,210,889 | B2 | * | 5/2007 | McFarland | B65G 1/127 198/465.3 |
| 7,464,822 | B2 | * | 12/2008 | Coffelt | B07C 3/00 198/370.03 |
| 7,717,255 | B2 | * | 5/2010 | Scott | B66C 3/20 198/468.2 |
| 2011/0198195 | A1 | * | 8/2011 | Sakita | B65F 1/0093 198/523 |
| 2012/0152697 | A1 | * | 6/2012 | Janzen | B65G 17/32 198/680 |

* cited by examiner

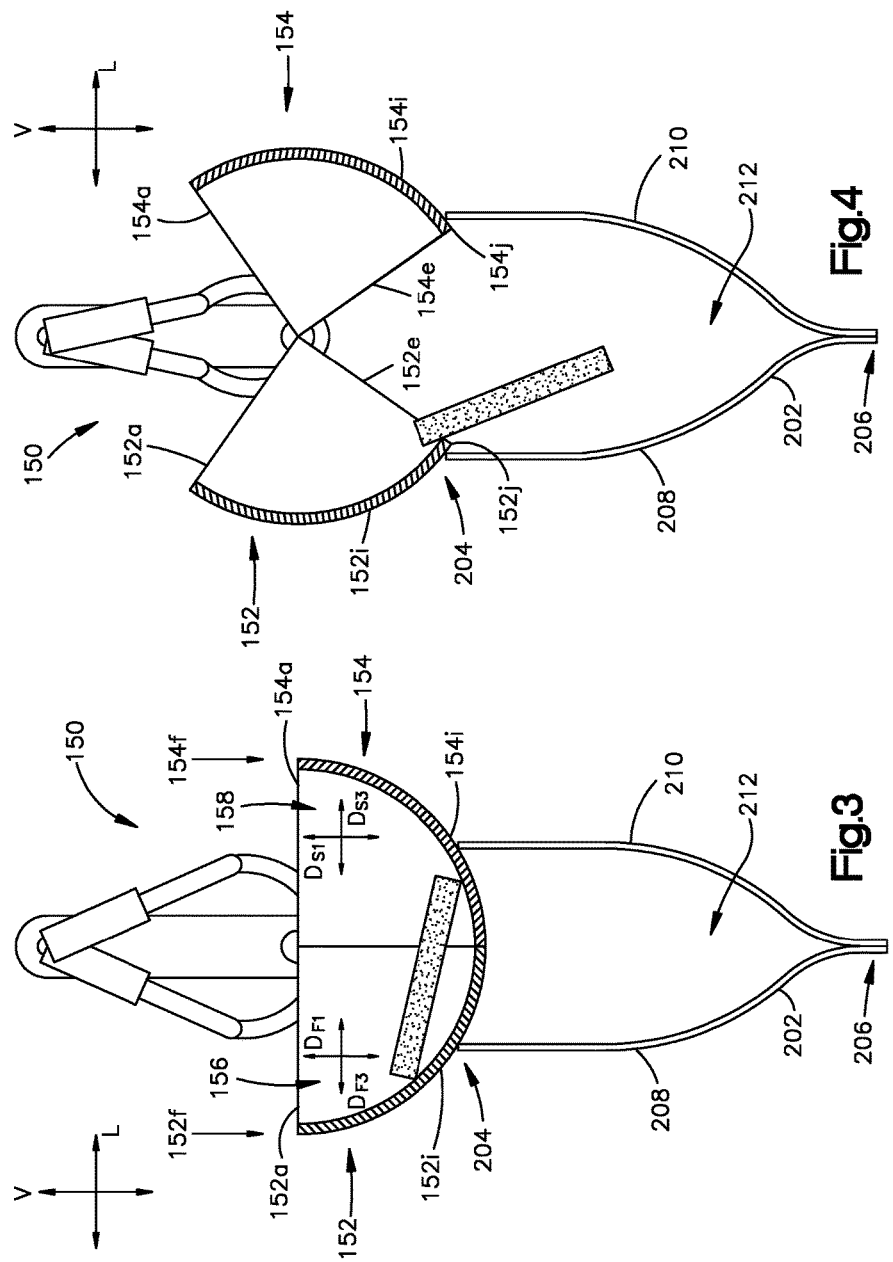

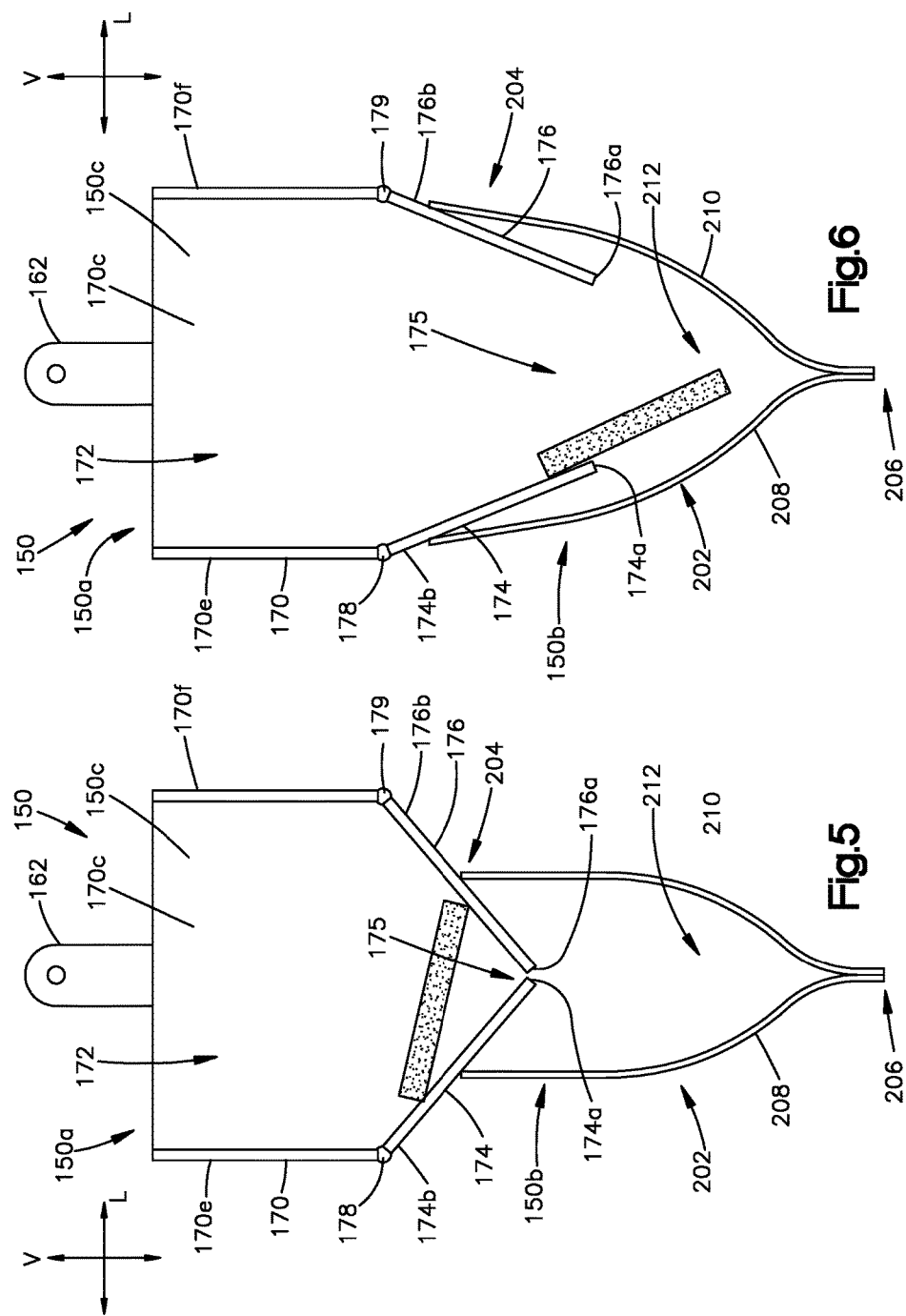

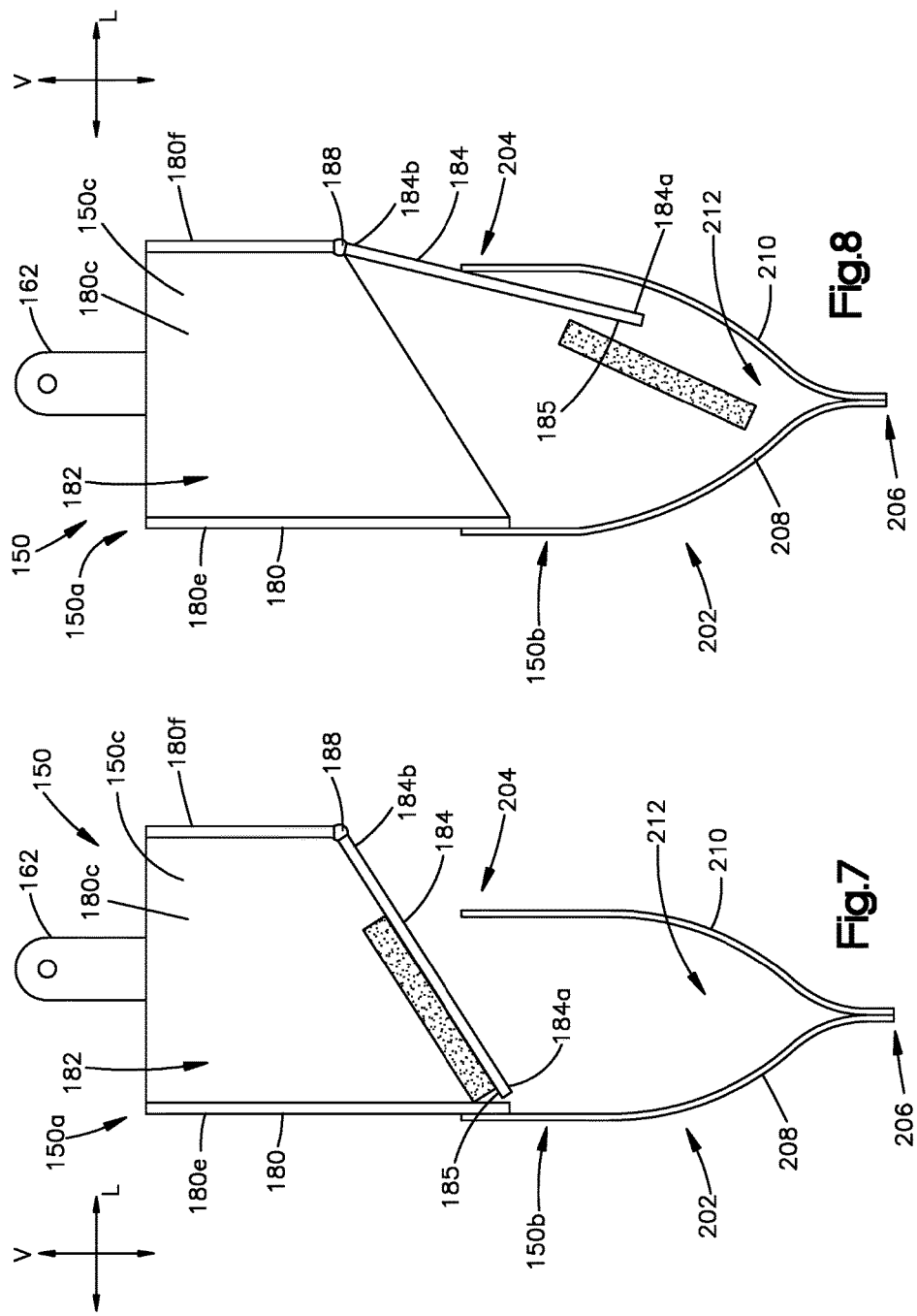

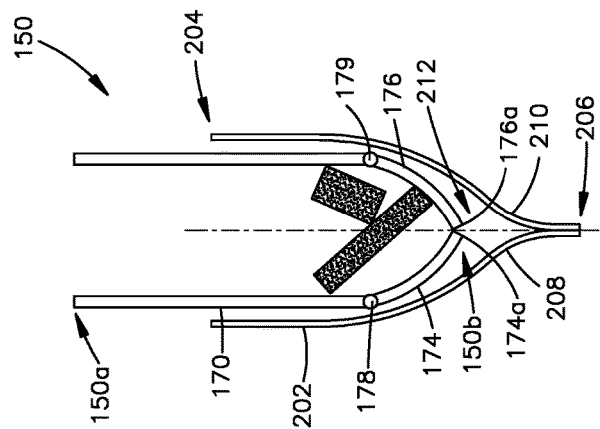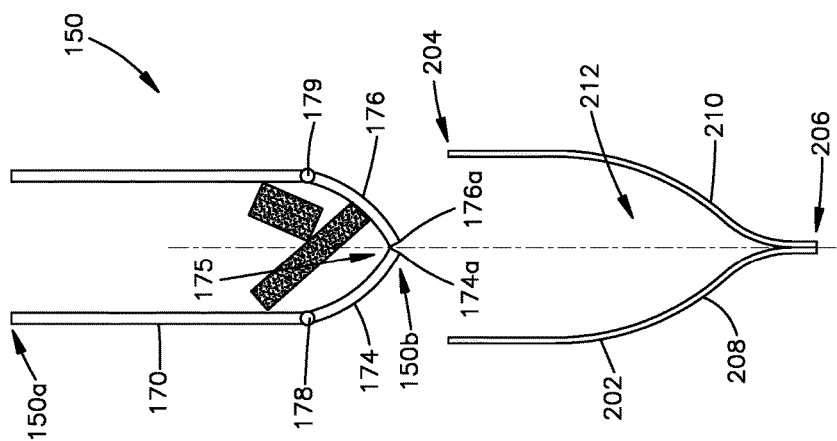

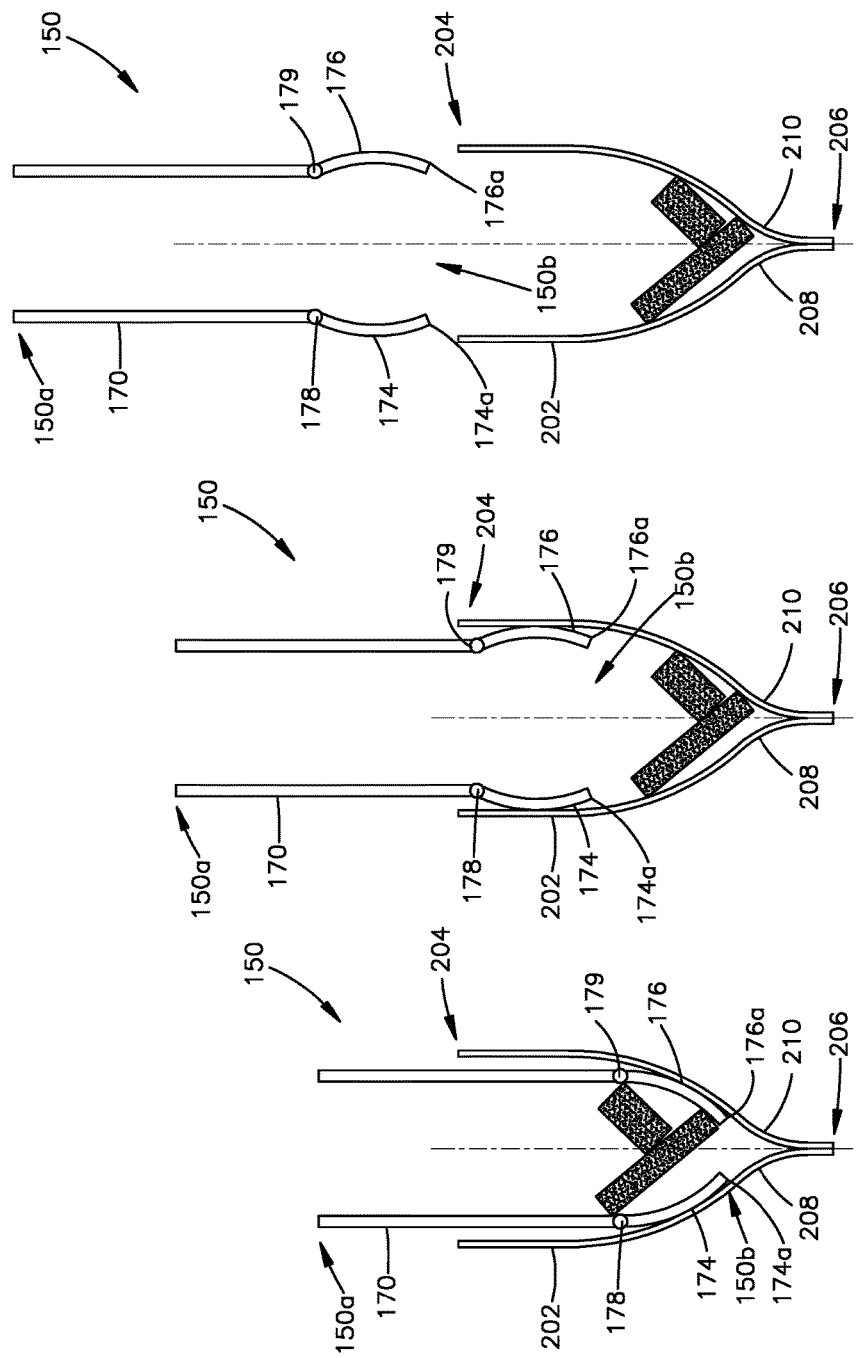

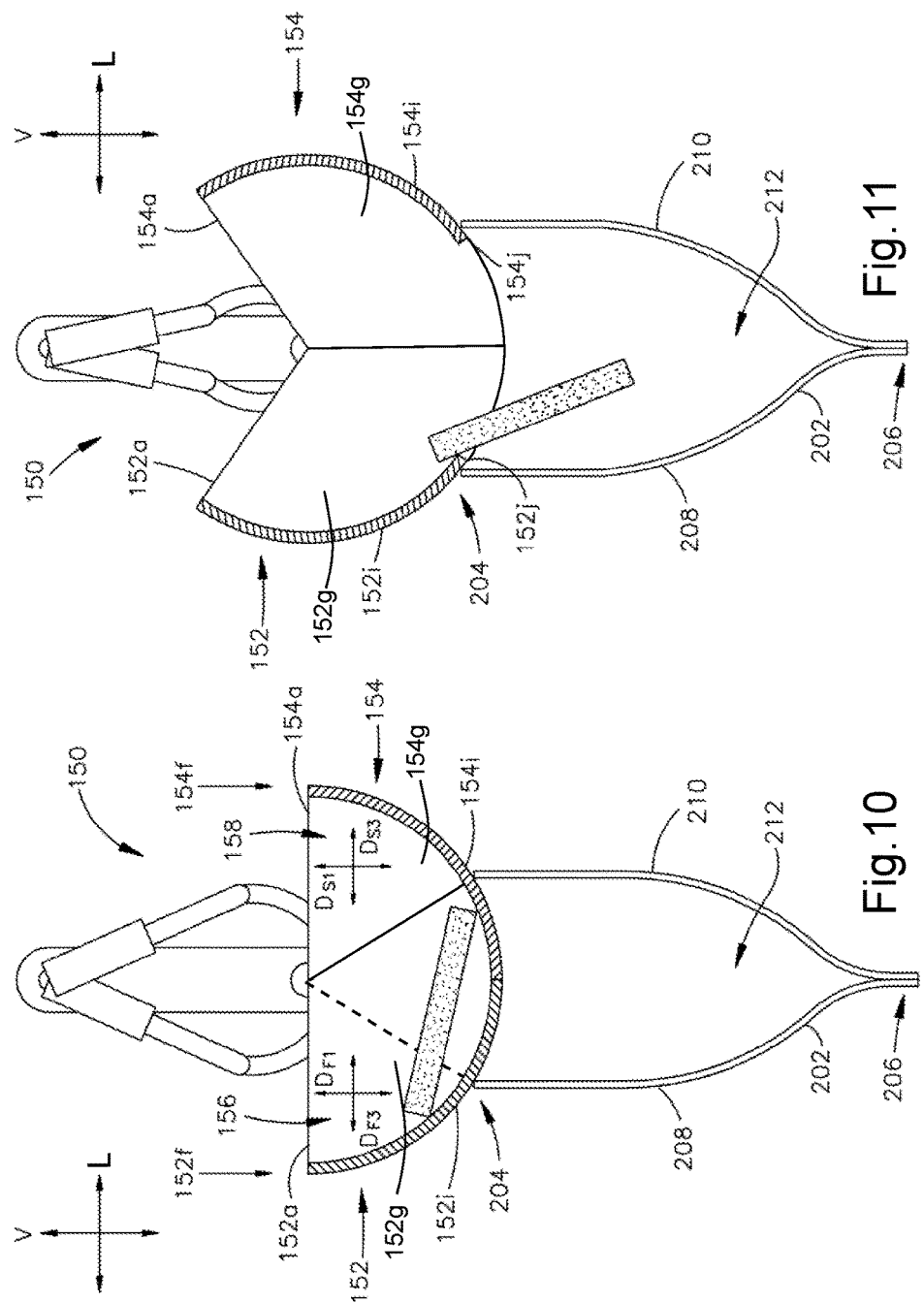

SYSTEM HAVING A CAROUSEL OF BUCKETS CONFIGURED TO INDUCT INVENTORY ITEMS INTO PACKAGING

BACKGROUND

Flexible flat packages such as standard envelopes, padded envelopes, and bubble mailers are commonly used to ship inventory items. Typically, the inventory items are placed into the packages by hand and the packages are sealed by hand, which is a relatively time consuming and labor intensive process. However, automating this process presents several challenges. For example, the inventory items should be placed into the package in a proper orientation so as to not impede the edges of the package that are subsequently sealed. This is made more difficult by the fact that flexible flat packages tend to deform based on the size and shape of the inventory items as the inventory items are placed therein.

BRIEF DESCRIPTION OF THE DRAWINGS

The following detailed description will be better understood when read in conjunction with the appended drawings, in which there is shown in the drawings example embodiments for the purposes of illustration. It should be understood, however, that the present disclosure is not limited to the precise arrangements and instrumentalities shown. In the drawings:

FIG. 3 shows a cross-sectional side view of the bucket of FIG. 2 in a transporting configuration and supporting an inventory item above a flat packaging;

FIG. 4 shows a cross-sectional side view of the bucket of FIG. 2 in a discharge configuration and dispensing an inventory item into the flat packaging;

FIG. 5 shows a cross-sectional side view of a bucket of FIG. 1 according to another embodiment in a transporting configuration and supporting an inventory item above a flat packaging;

FIG. 6 shows a cross-sectional side view of the bucket of FIG. 5 in a discharge configuration and dispensing an inventory item into the flat packaging;

FIG. 7 shows a cross-sectional side view of a bucket of FIG. 1 according to yet another embodiment in a transporting configuration and supporting an inventory item above a flat packaging;

FIG. 8 shows a cross-sectional side view of the bucket of FIG. 7 in a discharge configuration and dispensing an inventory item into the flat packaging;

FIGS. 9A-9E show cross-sectional side views of steps according to one embodiment of discharging inventory items from a bucket of FIG. 1 into a flat packaging;

FIG. 10 shows a cross-sectional side view of a bucket of FIG. 1 according to yet still another embodiment in a transporting configuration and supporting an inventory item above a flat packaging; and FIG. 11 shows a cross-sectional side view of the bucket of FIG. 10 in a discharge configuration and dispensing an inventory item into the flat packaging.

DETAILED DESCRIPTION

Figure 1:
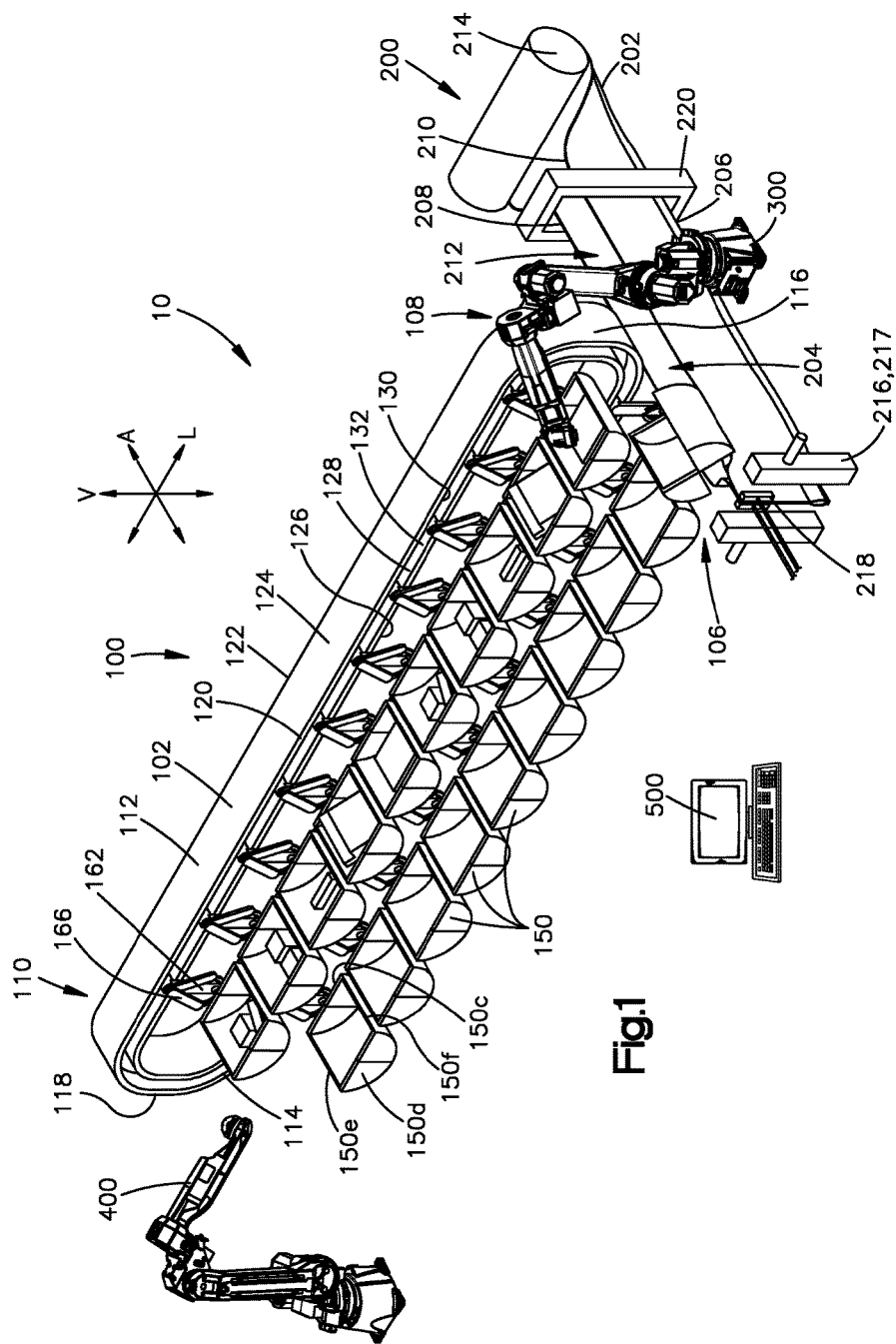
FIG. 1 shows a schematic diagram of a system having buckets configured to induct inventory items into a packaging according to one embodiment.

Referring to the Figs., an inventory packaging system 10 is shown according to one embodiment that is configured to package inventory items in a packaging material such as a flexible flat packaging material 202 or other packaging material (not shown). In at least some embodiments, the system 10 is capable of inducting a variety of inventory items of various sizes and shapes into the flexible flat packaging material 202 without the items falling out or the items blocking a sealing edge of the packaging. In general, the inventory packaging system 10 comprises an inventory induction carousel 100 that is configured to induct inventory items into the packaging material 202. The inventory packaging system 10 can further comprise at least one of (i) a packaging material handler 200 that is configured to support a packaging material 202 below the inventory induction carousel 100, (ii) a robotic manipulator 300 configured to reorient inventory items carried by the inventory induction carousel 100, and (iii) an inventory loader 400 such as a robotic manipulator, a person, or other suitable device configured to load inventory items onto the inventory induction carousel 100. It will be understood that the inventory induction carousel 100, the packaging material handler 200, the robotic manipulator 300, and the robotic manipulator 400 can be sold and distributed separately from one another, and therefore, systems of the disclosure may have as few as one of these features or up to all four of these features.

Figure 2:
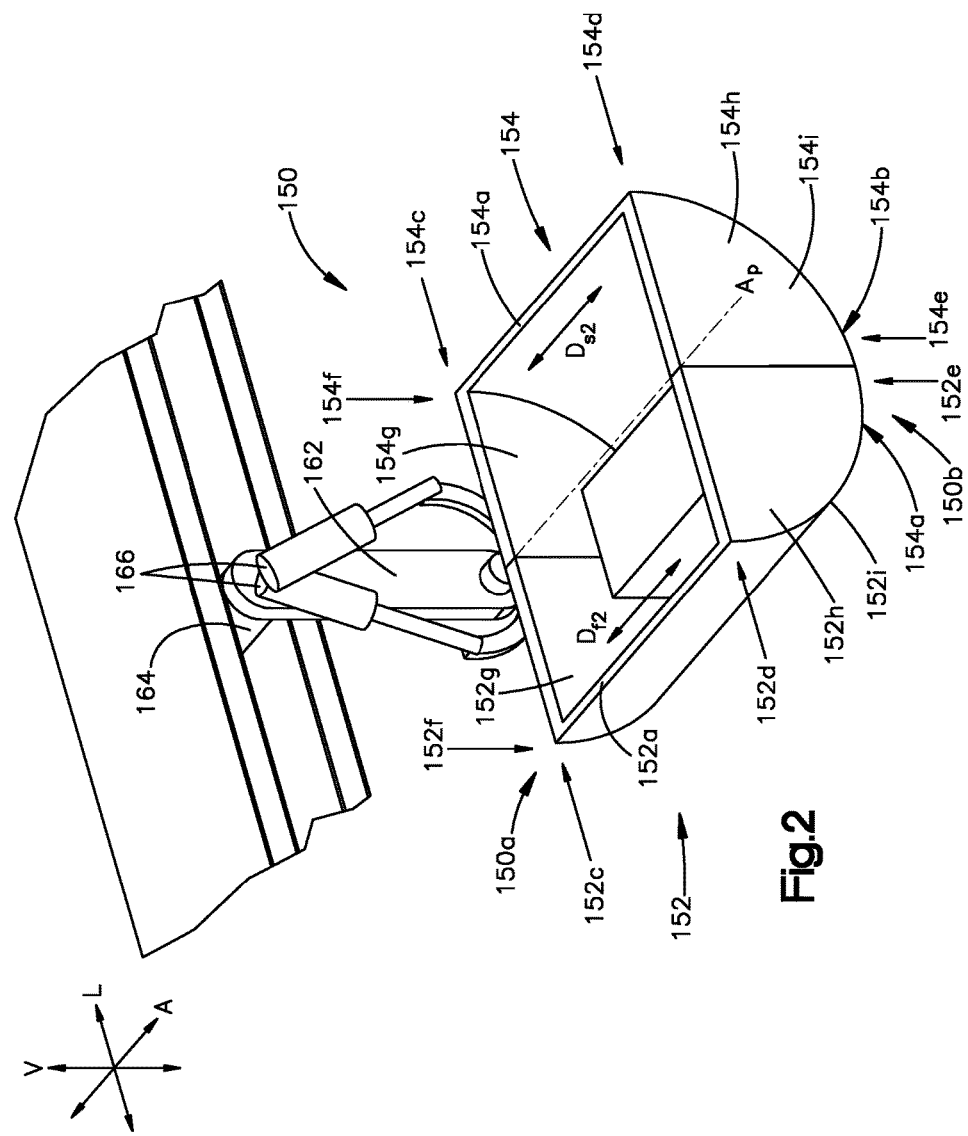
FIG. 2 shows a perspective view of a bucket of FIG. 1 according to one embodiment.

The inventory induction carousel 100 has a guiderail 102 and a plurality of buckets 150. The guiderail 102 defines a path that forms a loop, where the loop has a loading position 104 and an unloading position 106. The unloading position 106 is configured to be aligned above an open upper end 204 of the packaging material 202 when the packaging material 202 is supported by the packaging material handler 200. Each bucket 150 has an upper end 150a and a lower end 150b, where the lower end 150b includes at least one moveable bottom wall (e.g., 152i, 154i, 174, 176, 184). In some embodiments, the buckets 150 can be clamshell buckets as shown in FIGS. 2-4. In other embodiments, the buckets 150 can have other configurations as shown in FIGS. 5 to 8.

For each bucket 150, the at least one bottom wall is moveable between a transporting configuration (e.g., FIGS. 3, 5, and 7) and a discharge configuration (e.g., FIGS. 4, 6, and 8). In the transporting configuration, the at least one bottom wall substantially closes the lower end 150b of the bucket 150 such that the bucket 150 is configured to receive and carry inventory items. In the discharge configuration, the at least one bottom wall is moved so as to define an opening in the lower end 150b of the bucket 150 such that the bucket 150 is configured to discharge inventory items from the lower end 150b.

The buckets 150 are supported by the guiderail 102 such that the buckets 150 are configured to be driven from the loading position 104 towards the unloading position 106 in the transporting configuration (FIG. 3) so as to carry inventory items towards the unloading position 106. Further, the buckets 150 are configured to be transitioned to the discharge configuration (FIG. 4) at the unloading position 106 so as to discharge inventory items into a packaging material 202. Yet further, the buckets 150 are configured to be driven from the unloading position 106 back to the loading position 104. The buckets 150 can be transitioned back to the transporting configuration at any position on the loop from the unloading position 106 to the loading position 104 so as to configure the buckets 150 to receive subsequent inventory items at the loading position 104.

The packaging material handler 200 is configured to support a packaging material 202 below the unloading position 106. In FIG. 1, the packaging material 202 is illustrated as a flexible sheet or film that is unwound from a roll 214. The packaging material 202 can have a first side 208 and a second side 210 that are opposite of one another. Further, the packaging material 202 can be supported by the packaging material handler 200 such that an open upper end 204 of the packaging material 202 is spaced above a closed lower end 206 of the packaging material 202, and such that the first side 208 of the packaging material 202 faces the second side 210 of the packaging material 202 so as to define a void 212 therebetween. The open upper end 204 is aligned below the unloading position 106 so as to be configured to receive inventory items from each bucket 150 and into the void 212. The closed lower end 206 can be defined by a bend in the packaging material 202 between the first and second sides 208 and 210. Alternatively, the first and second sides 208 and 210 can be two separate sheets that are joined together at the closed lower end 206 by heat sealing, gluing, or other suitable joining technique.

Referring more specifically to FIG. 1, the guiderail 102 has a first end 108 and a second end 110 that are spaced from one another along a longitudinal direction L. The loading position 104 can be disposed at or adjacent to the first end 108, and the unloading position 106 can be disposed at or adjacent to the second end 110. The guiderail 102 can have first and second longitudinal second tracks 112 and 114 that are elongate from the first end to the second end, and first and second connecting tracks 116 and 118 that connect the first and second longitudinal tracks 112 and 114 to one another at the first and second ends 108 and 110, respectively. The first track 112 is an upper track and the second track 114 is a lower track. Thus, the guiderail 102 defines a path that forms a vertical loop. However, it will be understood that, in alternative embodiments, the first and second tracks can be side-by-side such that the guiderail 102 defines a path that forms a horizontal loop.

The guiderail 102 can have a first side 120 and a second side 122 that are spaced from one another along a lateral direction A, perpendicular to the longitudinal direction L. Further, the guiderail 102 can have an outer side 124 and an inner side 126 that are spaced from one another along the vertical direction V. The inner side 126 can be disposed inwardly of the outer side 124. The guiderail 102 can have a first internal rail surface 128 and a second internal rail surface 130 that are between the inner and outer sides 124 and 126 with respect to the vertical direction V. The first internal rail surface 128 can be disposed inwardly of the second internal rail surface 130 so as to define a channel 132 between the first and second internal rail surfaces 128 and 130. The channel 132 can extend into the first side 120 towards the second side 122, and can be configured to receive wheel assemblies of the buckets 150. It will be understood that in alternative embodiments, the guiderail 102 can have other suitable configurations. For example, the guiderail 102 can be configured such wheel assemblies move along the outer and inner sides 124 and 126, rather than of along the first and second internal rail surfaces 128 and 130. As another example, the guiderail 102 can be configured for a chain or belt assembly in lieu of wheel assemblies.

Each bucket 150 can have a first lateral side 150c and a second lateral side 150d spaced from one another along the lateral direction A. Further, each bucket 150 can have a first end 150e and a second end 150f spaced from one another along the longitudinal direction L. Each bucket 150 can include a coupling 162 (labeled in FIG. 2) that couples the bucket 150 to the guiderail 102. For example, the coupling 162 can couple the first lateral side 150c of the bucket 105 to the guiderail 102. Thus, the bucket 150 can be cantilevered as it extends from the first lateral side 150c to the second lateral side 150d. By cantilevering the bucket 150, the upper end 150a of the bucket 150 can remain relatively unobstructed so that inventory items can be loaded into the bucket 150 through the upper end 150a. Each coupling 162 can include at least one wheel 164 (labeled in FIG. 2) that is configured to move its bucket 150 around the guiderail 102. The at least one wheel 164 can be received in the channel 132 of the guardrail 102. It will be understood that in alternative embodiments, the at least one wheel 164 can move along an outer surface of the guiderail 102. Further, it will be understood that in alternative embodiments, the buckets 150 can move around the guiderail using assemblies other than wheels such as a chain or belt.

Each bucket 150 can also have at least one actuator 166 configured to transition the bucket 150 between the transporting configuration and the discharge configuration. The at least one actuator 166 can be any suitable actuator such as a hydraulic, pneumatic, electrical, thermal, or mechanical actuator. The at least one actuator 166 can be configured to cause the at least one bottom surface of the bucket 150 to move so as to open or close the lower end 150b.

As described above, the packaging material handler 200 is configured to support the packaging material below the unloading position 106 of the carousel 100. The packaging material 202 can be unwrapped from a roll 214 of the packaging material 202. Further, the packaging material 202 can be a flexible packaging material that is substantially flat, such as (without limitation) a sheet, a film, or bubble wrap. The packaging material handler 200 can include at least one of a sealer 216, a cutter 217, and a packaging material advancer 218. The sealer 216 and cutter 217 can be a single component such as a heat sealer that concurrently seals and cuts the packaging material 202 or can be separate components that seal and cut the packaging material 202 separately. The sealer 216 can implement any suitable sealing such as (without limitation) heat sealing or gluing. The sealer 216 is configured to seal the first and second sides 208 and 210 of the packaging material 202 to one another from the closed lower end 206 to the upper end 204 such that the packaging material 202 forms an envelope or pocket that houses inventory items. The sealer 216 can further seal the first and second sides 208 and 210 to one another along the open upper end 204 of the packaging material 202, or the open upper end 204 can be sealed by another sealer (not shown). The cutter 217 cuts the envelope or pocket away from the remaining packaging material 202 attached to the roll 214.

The packaging material advancer 218 advances the packaging material 202 so that the packaging material handler 200 can form subsequent envelopes or pockets. The packaging material advancer 218 can be a robotic arm or other suitable device that grabs the packaging material 202 and pulls the packaging material 202 along the lateral direction A away from the roll 214. The packaging material handler 200 can optionally include a packaging material folder 220 that folds the packaging material 202 such that the first side 208 of the packaging material 202 is opposite the second side 210 of the packaging material, and the open upper end 204 of the packaging material 202 is spaced above the closed lower end 206 of the packaging material 202. Note that in some embodiments, the packaging material 202 can be wrapped around the roll 214 in a folded manner such that the packaging material 202 need not be folded as it is unwrapped from the roll 214. Further, in other embodiments, the packaging material 202 can comprise two separate sheets that are sealed together, and therefore, the packaging material folder 220 can be omitted.

Each robotic manipulator 300 and 400 can be any suitable material handling robot (e.g., Cartesian robot, cylindrical robot, spherical robot, articulated robot, parallel robot, SCARA robot, anthropomorphic robot, any other suitable robotic manipulator and/or robotic arm, automated guided vehicles including lift capabilities, vertical lift modules, and any other suitable material handling equipment that interacts with or otherwise handles objects). Each robotic manipulator 300 and 400 can include any suitable type and number of sensors disposed throughout the robotic manipulator 300 and 400 (e.g., sensors in the base, in the arm, in joints in the arm, in an end effector, or in any other suitable location). The sensors can include sensors configured to detect pressure, force, weight, light, objects, slippage, and any other information that may be used to control and/or monitor the operation of the robotic manipulator 300 and 400, including an end effector. The sensors can be in communication with at least one controller 500. The at least one controller 500 can include a controller that is local to each robotic manipulator 300 and 400 (e.g., a robotic manipulator controller) or can be separate from, but in communication with, the robotic manipulators 300 and 400. In this manner, the at least one controller 500 can control the operation of the robotic manipulators 300 and 400 based at least in part on sensing information received from the sensors. The sensors may include any suitable combination of sensors capable of detecting depth of objects, capturing RGB and other images of objects, scanning machine-readable information, capturing thermal images, detecting position and orientation of objects, and performing any other suitable sensing as described herein.

Other material conveyance devices (not shown) may also be disposed adjacent to the robotic manipulator 400. The other material conveyance devices can be any suitable material conveyance system including, for example, a horizontal conveyor belt system, a pneumatic conveyor system, a vibrating conveyor system, a flexible conveyor system, a vertical conveyor system, a spiral conveyor system, an overhead conveyor system, and/or any other suitable material conveyance system suitable for conveying items. The other material conveyance devices can be used to transport inventory items to the inventory loader 400.

In operation, the inventory loader 400 places inventory items into a bucket 150 at the loading position 104. The bucket 150 is driven along the guiderail 102 from the loading position 104 to the unloading position 106. Movement of the bucket 150 along the guiderail 102 can be controlled by a controller 500 that directs the bucket 150 to move from the loading position 104 and directs the bucket 150 to stop moving at the unloading position 106. At or before the unloading position 104, the robotic manipulator 300 can reorient the inventory items if needed. For example, the robotic manipulator 300 can include a camera or at least one sensor that that identifies target area within the bucket 150 and a keep out zone. If the inventory items are outside of the target area and in the keep out zone, then the robotic manipulator 300 can reorient the inventory items such that they are disposed entirely within the target area. In some embodiments, the target area can include the interior volume of the bucket 150. Thus, the robotic manipulator 300 could reorient inventory items that extend beyond the outer perimeter of the bucket 150. If the robotic manipulator 300 is unable to find a solution that orients an inventory item entirely within the target area, then the controller 500 can direct the inventory packaging system 10 to bypass discharging the inventory items into the packaging material 200. Instead, the inventory items can be discharged at another location, where they can then be subsequently re-loaded into a bucket 150 for a subsequent packaging attempt. If subsequent packaging attempts are unsuccessful, then the inventory items can be packaged by another technique such as (without limitation) packaging by hand.

At the unloading position 104, the bucket 150 is transitioned from the transporting configuration to the discharge configuration. Thus, the at least one bottom wall is moved so as to open the lower end 150b of the bucket 150. For example, the at least one bottom wall can be moved by at least one actuator 166. The at least one actuator 166 can be controlled by at least one controller 500 that directs the at least one actuator 166 to move the at least one bottom wall so as to open the lower end 150b. The inventory items are then discharged through the open lower end 150b into the packaging material 202. The at least one bottom wall can then be moved so as to close the lower end 150b. For example, the at least one controller 500 can direct the at least one actuator 166 to move the at least one bottom wall so as to close the lower end 150b after the inventory items have been discharged into the packaging material 202. The bucket 150 can then be driven along the guiderail 102 from the unloading position 106 to the loading position 104. Movement of the bucket 150 along the guiderail 102 can be controlled by the at least one controller 500 that directs the bucket 150 to move from the unloading position 106 and directs the bucket 150 to stop moving at the loading position 106 to load subsequent inventory items.

After the inventory items are discharged from the bucket 150 into the packaging material 202, the packaging material advancer 218 advances the packaging material 202 with the inventory items away from the roll 214 and past the sealer 216. The sealer 216 seals the first and second sides 208 and 210 of the packaging material 202 to one another such that packaging material 202 forms an envelope or pocket that houses the inventory items. The cutter 217 then cuts the envelope or pocket from the remaining portion of the packaging material 202.

Turning now to the embodiment of FIGS. 2-4, the bucket 150 can be a clamshell bucket having a first shell 152 and a second shell 154 that oppose one another. The first shell 152 has a first upper end 152a and a first lower end 152b that oppose one another along a first direction $D_{F1}$. The first shell 152 has a first pair of lateral sides 152c and 152d that oppose one another along a second direction $D_{F2}$. The first shell 152 has a first inner side 152e and a first outer side 152f that oppose one another along a third direction $D_{F3}$. The first, second, and third directions are perpendicular to one another. In the transporting configuration (FIGS. 2 and 3), the first direction $D_{F1}$ is aligned with a vertical direction V, the second direction $D_{F2}$ is aligned with a lateral direction A, and the third direction $D_{F3}$ is aligned with a longitudinal direction L, where the vertical direction V, lateral direction A, and longitudinal direction L are perpendicular to one another. In the discharge configuration (FIG. 4), the first direction $D_{F1}$ is angularly offset from the vertical direction V, the second direction $D_{F2}$ is aligned with the lateral direction A, and the third direction $D_{F3}$ is angularly offset from the longitudinal direction L.

The first shell 152 has a first pair of sidewalls 152g and 152h, each sidewall 152g and 152h is disposed at a respective side of the first pair of lateral sides 152c and 152d. The first pair of sidewalls 152g and 152h are spaced from one another along the lateral direction A. The first pair of sidewalls 152g and 152h extend between the first upper end 152*a* and the first lower end 152*b*, and extend between the first inner side 152*e* and the first outer side 152*f*. The first pair of sidewalls 152*g* and 152*h* define a first void 156 therebetween. The first upper end 152*a* and first inner side 152*e* are each open to the first void 156. The first shell 152 also has a first bottom wall 152*i* that defines a bottom of the first void 156. The first bottom wall 152*i* has a first inner edge 152*j* at the first inner side 152*e*, and the first bottom wall 152*i* extends from the first inner edge 152*j* towards the first outer side 152*f*. The first bottom wall 152*i* extends between the first pair of sidewalls 152*g* and 152*h*, and extends from the first inner edge 152*j* towards the first outer side 152*f*. The first bottom wall 152*i* is angled downward along a direction that extends from the first outer side 152*f* towards the second shell 154 along the longitudinal direction L. In one example, as shown in the FIGS. 1 to 4, the first bottom wall 152*i* can be a single wall that extends from the first inner edge 152*j* to the first upper end 152*a* at the first outer side 152*f*. It will be understood that, in alternative embodiments, the first shell 152 can include a separate outer sidewall (not shown) at the first outer side 152*f*, and the first bottom wall 152*i* can extend from the first inner edge 152*j* to the outer sidewall.

The second shell 154 has a second upper end 154*a* and a second lower end 154*b* that oppose one another along a first direction $D_{S1}$. The second shell 154 has a second pair of lateral sides 154*c* and 154*d* that oppose one another along a second direction $D_{S2}$. The second shell 154 has a second inner side 154*e* and a second outer side 154*f* that oppose one another along a third direction $D_{S3}$. The first, second, and third directions are perpendicular to one another. Note that the first to third directions of the second shell 154 coincide with the first to third directions of the first shell 152 in the transporting configuration, but not in the discharge configuration. In the transporting configuration (FIGS. 2 and 3), the first direction $D_{S1}$ is aligned with a vertical direction V, the second direction $D_{S2}$ is aligned with a lateral direction A, and the third direction $D_{S3}$ is aligned with a longitudinal direction L, where the vertical direction V, lateral direction A, and longitudinal direction L are perpendicular to one another. In the discharge configuration (FIG. 4), the first direction $D_{S1}$ is angularly offset from the vertical direction V, the second direction $D_{S2}$ is aligned with the lateral direction A, and the third direction $D_{S3}$ is angularly offset from the longitudinal direction L.

The second shell 154 has a second pair of sidewalls 154*g* and 154*h*, each sidewall 154*g* and 154*h* disposed a respective side of the second pair of lateral sides 154*c* and 154*d*. The second pair of sidewalls 154*g* and 154*h* are spaced from one another along the lateral direction A. The second pair of sidewalls 154*g* and 154*h* extend between the second upper end 154*a* and the second lower end 154*b*, and extend between the second inner side 154*e* and the second outer side 154*f*. The second pair of sidewalls 154*g* and 154*h* define a second void 158 therebetween. The second upper end 154*a* and second inner side 154*e* are each open to the second void 158. The second shell 154 also has a second bottom wall 154*i* that defines a bottom of the second void 158. The second bottom wall 154*i* has an inner edge 154*j* at the second inner side 154*e*. The second bottom wall 154*i* extends from the second inner edge 152*j* towards the second outer side 154*f*. The second bottom wall 154*i* extends between the second pair of sidewalls 154*c* and 154*d*, and extends from the second inner side 154*e* towards the second outer side 154*f*. The second bottom wall 154*i* is angled downward along a direction that extends from the second outer side 154*f* towards the first shell 152 along the longi-tudinal direction L. In one example, as shown in the FIGS. 1 to 4, the second bottom wall 154*i* can be a single wall that extends from the second inner edge 154*j* to the second upper end 154*a* at the second outer side 154*f*. It will be understood that, in alternative embodiments, the second shell 154 can include a separate outer sidewall (not shown) at the second outer side 154*f*, and the second bottom wall 154*i* can extend from the second inner edge 154*j* to the outer sidewall.

In the transporting configuration, the first inner side 152*e*, and hence the first void 156, is open to the second inner side 154*e*, and hence the second void 158. Further, the first inner edge 152*j* and the second inner edge 152*j* are adjacent to one another so as to substantially close the lower end 150*b* of the bucket 150. For example, the first and second inner edges 152*j* and 154*j* can be offset from one another by a distance that is less than a dimension of the inventory item carried by the bucket 150 so as to prevent the bucket 150 from discharging through the lower end 150*b* of the bucket 150. In some embodiments, the first and second inner edges 152*j* and 154*j* can abut one another in the transporting configuration. Thus, the distance can be about zero. The first and second bottom walls 152*i* and 154*i* angle downwards and towards one another. Thus, the lower end 150*b* of the bucket 150 can define a low point or valley 155 into which inventory items can be collected. In this example, the bottom walls 152*i* and 154*i* curve as they angle downwards and towards one another. However, in alternative embodiments as shown in FIG. 5, the bottom walls can be straight as they angle downwards.

As shown in FIGS. 2-4, when the bucket 150 is in the transporting configuration, the first sidewalls 152*g* and 154*g* of the first and second shells 152 and 154 can be arranged end-to-end with one another, and the second sidewalls 152*h* and 154*h* of the first and second shells 152 and 154 can be arranged end-to-end with one another. As the bucket 150 transitions to the discharge configuration, the first sidewalls 152*g* and 154*g* move away from one another and the second sidewalls 152*h* and 154*h* move away from one another.

In an alternative configuration, and with reference to FIG. 10, the first sidewalls 152*g* and 154*g* can be extended so as to overlap one another with respect to the lateral direction A when the bucket 150 is in the transporting configuration. In other words, rather than being arranged end-to-end, one of the first sidewalls 152*g* and 154*g* can be disposed inward relative to the other one of the first sidewalls 152*g* and 154*g*. Thus, the first sidewalls 152*g* and 154*g* can be in-line with one another along the lateral direction A such that a line extending along the lateral direction A intersects both of the first sidewalls 152*g* and 154*g*. Additionally or alternatively, the second sidewalls 152*g* and 154*g* can be extended in a similar manner so as to overlap one another with respect to the lateral direction A in the transporting configuration. Consequently, when the bucket is in the discharge configuration of FIG. 11, the first sidewalls 152*g* and 154*g* and the second sidewalls 152*h* and 154*h* can maintain the lateral sides 150*c* and 150*d* of the bucket closed such that inventory items do not inadvertently pass through the lateral sides 150*c* and 150*d*.

The first and second shells 152 and 154 of the bucket 150 are pivotable between the transporting configuration and the discharge configuration. For instance, the first shell 152 is configured such that the first inner edge 152*j* pivots towards the second inner edge 154*j* to transition to the transporting configuration and pivots away from the second inner edge 154*j* to transition to the discharge configuration. Similarly, the second shell 154 is configured such that the second inner edge 154*j* pivots towards the first inner edge 152*j* to transition to the transporting configuration and pivots away from the first inner edge 152*j* to transition to the discharge configuration. In the discharge configuration, the first and second inner edges 152*j* and 154*j* can be offset from one another by a distance that is greater than the distance between the first and second inner edges 152*j* and 154*j* in the transporting configuration. As the bucket 150 transitions to the discharge configuration, its first and second bottom walls 152*i* and 154*i* can engage the first and second sides 208 and 210 of the packaging material 202 so as to move the first and second sides 208 and 210 away from one another. Thus, the first and second sides 208 and 210 of the packaging material 202 can be offset from one another by a first distance when the bucket 150 is in the transporting configuration, and can be offset by a second distance, greater than the first distance, when the bucket 150 is in the discharge configuration.

The bucket 150 includes at least one pivot 160 configured to pivot at least one of the first and second shells 152 and 154, and hence the first and second bottom walls 152*i* and 154*i*, relative to the other. For example, the bucket 150 can include a pivot 160 configured to pivot the first shell 152 relative to the second shell 154 about a pivot axis A. The pivot 160 can further be configured to pivot the second shell 154 relative to the first shell 152 about the pivot axis A. Thus, the first and second shells 152 and 154 can share a common pivot 160 as shown in FIGS. 1 to 4. However, as will be described in relation to FIGS. 5 and 6 below, in alternative embodiments, the first and second shells 152 and 154 can have separate pivots and separate pivot axes that are spaced from one another.

Turning now to the embodiment of FIGS. 5 and 6, the bucket 150 has an outer wall 170 that defines an outer perimeter of the bucket 150 and at least partially defines a void 172 within the outer perimeter. The outer wall 170 can have a substantially box-like shape, although it will be understood that the outer wall 170 can have other shapes such as (without limitation) a cylindrical tube. The outer wall 170 has a pair of lateral sidewalls 170*c* and 170*d* that are spaced from one another along the lateral direction A. The lateral sidewalls 170*c* and 170*d* are disposed at the lateral sides 150*c* and 150*d* of the bucket 150, respectively. Further, the lateral sidewalls 170*c* and 170*d* extend between the upper and lower ends 150*a* and 150*b* of the bucket 150. The outer wall 170 has a pair of end walls 170*e* and 170*f* that are spaced from one another along the longitudinal direction L. The end walls 170*e* and 170*f* are disposed at the ends 150*e* and 150*f* of the bucket 150. The end walls 170*e* and 170*f* extend between the upper and lower ends 150*a* and 150*b* of the bucket 150 and between the lateral sidewalls 170*c* and 170*d* of the bucket 150. The sidewalls 170*c* and 170*d* and the end walls 170*e* and 170*f* define the void 172. The upper end 150*a* is open to the void 172 so as to permit inventory items to be loaded into the void 172 through the upper end 150*a*.

The bucket 150 has a first bottom wall 174 and a second bottom wall 176 that defines a bottom of the void 172. The first bottom wall 174 has a first inner edge 174*a* and a first outer edge 174*b*. The first outer edge 174*b* is coupled to the first end wall 170*e*. Thus, the first bottom wall 174 extends from the first end wall 170*e* to the first inner edge 174*a*. The first bottom wall 174 is angled downward from the first outer edge 174*b* to the first inner edge 174*a* when the bucket 150 is in the transporting configuration. In other words, the first bottom wall 174 is angled downward along a direction that extends from the first end wall 170*e* towards the second bottom wall 176 along the longitudinal direction L. Similarly, the second bottom wall 176 has a second inner edge 176*a* and a second outer edge 176*b*. The second outer edge 176*b* is coupled to the second end wall 170*f*. Thus, the second bottom wall 176 extends from the second end wall 170*f* to the second inner edge 176*a*. The second bottom wall 176 is angled downward from the second outer edge 176*b* to the second inner edge 176*a* when the bucket 150 is in the transporting configuration. In other words, the second bottom wall 176 is angled downward along a direction that extends from the second end wall 170*f* towards the first bottom wall 174 along the longitudinal direction L.

In the transporting configuration, the first inner edge 174*a* and the second inner edge 176*a* are adjacent to one another so as to substantially close the lower end 150*b* of the bucket 150. For example, the first and second inner edges 174*a* and 176*a* can be offset from one another by a distance that is less than a dimension of the inventory item carried by the bucket 150 so as to prevent the bucket 150 from discharging through the lower end 150*b* of the bucket 150. In some embodiments, the first and second inner edges 174*a* and 174*b* can abut one another in the transporting configuration. Thus, the distance can be about zero. The first and second bottom walls 174 and 176 angle downwards and towards one another. Thus, the lower end 150*b* of the bucket 150 can define a low point or valley 175 into which inventory items can be collected.

The first and second bottom walls 174 and 176 of the bucket 150 are pivotable between the transporting configuration and the discharge configuration. For instance, the first bottom wall 174 is configured such that the first inner edge 174*a* pivots towards the second inner edge 176*a* to transition to the transporting configuration and pivots away from the second inner edge 176*a* to transition to the discharge configuration. Similarly, the second bottom wall 176 is configured such that the second inner edge 176*a* pivots towards the first inner edge 174*b* to transition to the transporting configuration and pivots away from the first inner edge 174*b* to transition to the discharge configuration. In the discharge configuration, the first and second inner edges 174*a* and 176*a* can be offset from one another by a distance that is greater than the distance between the first and second inner edges 174*a* and 176*a* in the transporting configuration.

The bucket 150 includes at least one first pivot 178 configured to pivot the first bottom wall 174 relative to the second bottom wall 176 and the outer wall 170. The first pivot 178 can be configured to pivot the first bottom wall 174 about a first pivot axis that extends along the lateral direction A. The bucket 150 includes at least one second pivot 179 configured to pivot the second bottom wall 176 relative to the first bottom wall 174 and the outer wall 170. The second pivot 179 can be configured to pivot the second bottom wall 176 about a second pivot axis that extends along the lateral direction A.

As the bucket 150 transitions to the discharge configuration, its first and second bottom walls 174 and 176 can engage the first and second sides 208 and 210 of the packaging material 202 so as to move the first and second sides 208 and 210 away from one another. Thus, the first and second sides 208 and 210 of the packaging material 202 can be offset from one another by a first distance when the bucket 150 is in the transporting configuration, and can be offset by a second distance, greater than the first distance, when the bucket 150 is in the discharge configuration.

In an alternative embodiment, the bucket 150 can be lowered into the void 212 in the packaging material 202 as shown in FIGS. 9A and 9B. Then, the first and second bottom walls 174 and 176 can be opened as the bucket 150 is withdrawn from the packaging material 202 as shown in FIGS. 9C-9E such that the inventory items are left inside of the packaging material 202. The first and second bottom walls 174 and 176 can be opened by an actuator such as those discussed above. Alternatively, the first and second bottom walls 174 and 176 can be unlocked from the transporting configuration of FIGS. 9A and 9B, and the weight of the inventory items can cause the first and second bottom walls 174 and 176 to move away from one another so as to allow the inventory items to discharge into the packaging material 202.

Turning now to the embodiment of FIGS. 7 and 8, the bucket 150 is similar to the bucket in FIGS. 5 and 6 except that it has only one bottom wall 184. The bucket has an outer wall 180 that defines an outer perimeter of the bucket 150 and at least partially defines a void 182 within the outer perimeter. The outer wall 180 can have a substantially box-like shape, although it will be understood that the outer wall 180 can have other shapes such as (without limitation) a cylindrical tube. The outer wall 180 has a pair of lateral sidewalls 180c and 180d that are spaced from one another along the lateral direction A. The lateral sidewalls 180c and 180d are disposed at the lateral sides 150c and 150d of the bucket 150, respectively. Further, the lateral sidewalls 180c and 180d extend between the upper and lower ends 150a and 150b of the bucket 150. The outer wall 180 has a pair of end walls 180e and 180f that are spaced from one another along the longitudinal direction L. The end walls 180e and 180f are disposed at the ends 150e and 150f of the bucket 150. The end walls 180e and 180f extend between the upper and lower ends 150a and 150b of the bucket 150 and between the lateral sidewalls 180c and 180d of the bucket 150. The sidewalls 180c and 180d and the end walls 180e and 180f define the void 182. The upper end 150a is open to the void 182 so as to permit inventory items to be loaded into the void 182 through the upper end 150a.

The bucket 150 has a bottom wall 184 that defines a bottom of the void 182. The bottom wall 184 has an inner edge 184a and an outer edge 184b. The outer edge 184b is coupled to the second end wall 180f, although it will be understood that the outer edge 184b could instead be coupled to the first end wall 180e. The bottom wall 184 extends from the second end wall 180f to the inner edge 184a. The bottom wall 184 is angled downward from the outer edge 184b to the inner edge 184a when the bucket 150 is in the transporting configuration. In other words, the bottom wall 184 is angled downward along a direction that extends from the second end wall 180f towards the first end wall 180e along the longitudinal direction L.

In the transporting configuration, the inner edge 184a is adjacent to the first end wall 180e so as to substantially close the lower end 150b of the bucket 150. For example, the inner edge 184a can be offset from the first end wall 180e by a distance that is less than a dimension of the inventory item carried by the bucket 150 so as to prevent the bucket 150 from discharging through the lower end 150b of the bucket 150. In some embodiments, the inner edge 184a can abut the first end wall 180e in the transporting configuration. Thus, the distance can be about zero. The bottom wall 184 angles downwards towards the first end wall 180e. Thus, the lower end 150b of the bucket 150 can define a low point or valley 185 into which inventory items can be collected.

The bottom wall 184 of the bucket 150 is pivotable between the transporting configuration and the discharge configuration. For instance, the bottom wall 184 is configured such that the inner edge 184a pivots towards the first end wall 180e to transition to the transporting configuration and pivots away from the first end wall 180e to transition to the discharge configuration. In the discharge configuration, the inner edge 184a can be offset from the first end wall 180e by a distance that is greater than the distance between the inner edge 184a and the first end wall 180e in the transporting configuration. As the bucket 150 transitions to the discharge configuration, the bottom wall 184 and the first end wall 180e can engage the first and second sides 208 and 210 of the packaging material 202 so as to move the first and second sides 208 and 210 away from one another. Thus, the first and second sides 208 and 210 of the packaging material 202 can be spaced from one another by a first distance when the bucket 150 is in the transporting configuration, and can be spaced by a second distance, greater than the first distance, when the bucket 150 is in the discharge configuration. The bucket 150 includes at least one first pivot 188 configured to pivot the bottom wall 184 relative to the outer wall 180. The pivot 188 can be configured to pivot the bottom wall 184 about a first pivot axis that extends along the lateral direction A.

It should be noted that the illustrations and descriptions of the embodiments shown in the figures are for exemplary purposes only, and should not be construed limiting the disclosure. One skilled in the art will appreciate that the present disclosure contemplates various embodiments. Additionally, it should be understood that the concepts described above with the above-described embodiments may be employed alone or in combination with any of the other embodiments described above. It should further be appreciated that the various alternative embodiments described above with respect to one illustrated embodiment can apply to all embodiments as described herein, unless otherwise indicated.

Unless explicitly stated otherwise, each numerical value and range should be interpreted as being approximate as if the word "about" or "approximately" preceded the value or range.

It should be understood that the steps of exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

What is claimed:

1. An inventory packaging system configured to induct inventory items into a packaging material, the inventory packaging system comprising:
a packaging material handler configured to support a packaging material such that an open upper end of the packaging material is spaced above a closed lower end of the packaging material, and such that a first side of the packaging material is spaced from a second side of the packaging material so as to define a void therebetween; and
an inventory induction carousel having:
a guiderail that defines a path that forms a loop, the loop having a loading position and an unloading position, the unloading position being aligned relative to the packaging material handler such that the unloading position is directly above the open upper end of the packaging material when the packaging material is supported by the packaging material handler; and
a plurality of buckets supported by the guiderail, the plurality of buckets including at least a first bucket having an upper end and having a lower end that includes at least one bottom wall that is moveable between (i) a transporting configuration wherein the at least one bottom wall substantially closes the lower end of the bucket such that the bucket is configured to receive and carry inventory items and (ii) a discharge configuration wherein the at least one bottom wall is moved so as to define an opening in the lower end such that the bucket is configured to discharge inventory items from the lower end, wherein the inventory packaging system is configured to drive the buckets from the loading position towards the unloading position in the transporting configuration so as to carry inventory items towards the unloading position, and is configured to transition the buckets to the discharge configuration so as to unload inventory items at the unloading position directly into the open upper end of the packaging material.

2. The inventory packaging system of claim 1, wherein the at least one bottom wall is angled downwards so as to at least partially define a valley at the lower end that is configured to collect the inventory items.

3. The inventory packaging system of claim 1, wherein the at least one bottom wall includes first and second bottom walls that are adjacent to one another in the transporting configuration and are spaced from one another in the discharge configuration.

4. An inventory packaging system comprising an inventory induction carousel, the inventory induction carousel having:
a guiderail that defines a path that forms a loop, the loop having a loading position and an unloading position; and
a plurality of buckets that includes at least a first bucket having an upper end and having a lower end that includes at least one bottom wall that is moveable between (i) a transporting configuration wherein the at least one bottom wall substantially closes the lower end of the first bucket and (ii) a discharge configuration wherein the at least one bottom wall is moved so as to define an opening in the lower end of the first bucket,
wherein the first bucket has a first lateral side, a second lateral side, and a coupling that couples the first lateral side to the guiderail such that the first bucket is cantilevered as it extends from the first lateral side to the second lateral side, and
wherein the buckets are supported by the guiderail such that the buckets are configured to be driven from the loading position towards the unloading position in the transporting configuration, and are configured to be transitioned to the discharge configuration so as to unload inventory items at the unloading position into a packaging material when the packaging material is aligned below the unloading position.

5. The inventory packaging system of claim 4, wherein the at least one bottom wall is angled downwards so as to at least partially define a valley at the lower end that is configured to collect the inventory items.

6. The inventory packaging system of claim 4, wherein the at least one bottom wall includes first and second bottom walls that are spaced farther from one another when the first bucket is in the discharge configuration than when the first bucket is in the transporting configuration.

7. The inventory packaging system of claim 6, wherein the first and second bottom walls include first and second inner edges that abut one another when the first bucket is in the transporting configuration.

8. The inventory packaging system of claim 6, wherein the first bucket is a clamshell bucket that includes opposed first and second shells that include the first and second bottom walls, respectively.

9. The inventory packaging system of claim 4, wherein the first bucket has an outer wall that defines an outer perimeter of the first bucket and at least partially defines a void within the outer perimeter, the outer wall having opposed first and second sidewalls, wherein the at least one bottom wall extends from one of the first and second sidewalls.

10. The inventory packaging system of claim 4, wherein the first bucket includes at least one pivot configured to pivot the at least one bottom wall between the transporting configuration and the discharge configuration.

11. The inventory packaging system of claim 4, comprising the packaging material aligned below the unloading position, the packaging material having an open upper end, a closed lower end, and first and second sides that are spaced from one another so as to define a void therebetween, wherein the open upper end is aligned below the unloading position so as to be configured to receive inventory items from each bucket and into the void.

12. The inventory packaging system of claim 11, wherein the packaging material comprises a flexible sheet or film that has the first side and the second side.

13. The inventory packaging system of claim 4, comprising a packaging material handler configured to support a packaging material such that an open upper end of the packaging material is spaced above a closed lower end of the packaging material and aligned below the unloading position, and such that a first side of the packaging material is spaced from a second side of the packaging material so as to define a void therebetween.

14. The inventory packaging system of claim 13, wherein the at least one bottom wall is configured to engage the at least one of the first and second sides of the packaging material so as to move at least one of the first and second sides away from the other of the first and second sides when the first bucket transitions from the transporting configuration to the discharge configuration.

15. The inventory packaging system of claim 4, wherein the guiderail has an upper track, a lower track, and first and second connecting tracks that oppose one another and that connect the upper and lower tracks to one another.

16. The inventory packaging system of claim 1, comprising the packaging material supported by the packaging material handler directly under the unloading position.

17. The inventory packaging system of claim 1, wherein the packaging material is flexible packaging material, and the packaging material handler includes a sealer configured to seal the packaging so as to form an envelope or pocket that houses inventory items.

18. The inventory packaging system of claim 1, comprising a robotic manipulator configured to load inventory items into the buckets of the inventory induction carousel.

* * * * *